(12) United States Patent
Niina et al.

(10) Patent No.: US 6,371,747 B1
(45) Date of Patent: Apr. 16, 2002

(54) DIE MOLDING APPARATUS FOR RESIN ARTICLE

(75) Inventors: Yoshinari Niina; Kyotaro Yoshii; Junichi Inoue; Hiroshi Gohara, all of Miyazaki (JP)

(73) Assignee: Honda Lock Mfg. Co., Ltd., Miyazaki (JP)

( * ) Notice: Subject to any disclaimer, the term of this patent is extended or adjusted under 35 U.S.C. 154(b) by 0 days.

(21) Appl. No.: 09/532,947

(22) Filed: Mar. 22, 2000

(30) Foreign Application Priority Data

Mar. 24, 1999 (JP) .......................... 11-079750
Mar. 24, 1999 (JP) .......................... 11-079751
Mar. 24, 1999 (JP) .......................... 11-079752

(51) Int. Cl.⁷ ............................ B29C 45/16
(52) U.S. Cl. .................. 425/130; 264/572; 425/572
(58) Field of Search .................. 425/572, 130; 264/572

(56) References Cited

U.S. PATENT DOCUMENTS 5,090,886 A * 2/1992 Jaroschek ................ 425/130
6,000,925 A * 12/1999 Daniels ................... 425/130

* cited by examiner

Primary Examiner—Tim Heitbrink
(74) Attorney, Agent, or Firm—Liniak, Berento, Longacre & White

(57) ABSTRACT

In a die molding apparatus for molding resin articles having a plurality of molds for forming a cavity in communication with an injection gate and a gas charging nozzle capable of charging the inside of the cavity with a gas after the completion of resin injection to form a resin article having a hollow inside, an overflow portion for relieving an excess molten resin and a film gate for communication between the main cavity portion and the overflow portion are formed between a pair of molds forming the other end of the cavity, and the gap between both of molds is set to 1.5 mm or less at the film gate; the gas charging nozzle is situated in the cavity with a gas charging hole being positioned in the cavity; and a hole-sealed hollow cylinder is formed between one of molds and the gas charging nozzle, the hole-sealed hollow cylinder having an inner surface shape defined by the outer surface of the cylindrical small diameter portion and the step and an outer surface shape defined by the inner surface of the insertion hole of the gas charging nozzle provided the cavity.

3 Claims, 3 Drawing Sheets

DIE MOLDING APPARATUS FOR RESIN ARTICLE

BACKGROUND OF THE INVENTION

1. Field of the Invention

The present invention concerns a die molding apparatus for molding resin articles. The molding apparatus has a plurality of molds for defining a cavity including a main cavity portion extending substantially linearly in a mold closure state one end thereof being in communication with an injection gate, and has a gas charging nozzle capable of charging at least the inside of the main cavity portion with a gas from the one end after injection of a predetermined amount of molten resin from the injection gate has been completed. The apparatus is used to form a resin article including a main portion an outer shape conforming the shape of the main cavity portion and having a hollow inside having a shape corresponding to that of the cavity by the charging of the gas.

2. Statement of Related Art

In such molding apparatus described above, a resin article having a hollow portion at least in the inside of the main portion of article has been molded by charging a gas at least to the inside of the main cavity portion from one end thereof after injection of molten resin from an injection gate. However, since the other end of the main cavity portion is closed and there is no room for relieving the molten resin upon charging of the gas, wall thickness is increased locally at the other end of the main portion of the resin article after the completion of molding, which sometimes results in mold sink marks and degrades the commercial worth of articles.

For preventing such sink marks in existent resin molding, it has been provided a molding apparatus in which an excess molten resin from the main cavity portion is relieved to an overflow portion in communication with the other end of the main cavity portion. Then, it is possible to prevent localized increase of the wall thickness at the other end of the main portion of the resin article. However, since the gas is also relieved partially to the overflow portion, when the excess part of the resin corresponding to the overflow portion is removed from the completed molding resin article, a through hole is formed undesirably at the other end of the main cavity portion due to the partial escape of the gas into the overflow portion. This necessitates a treatment for closing the through hole. As a result, it takes an additional labor corresponding to this treatment and, in addition, the aesthetic appearance after closing the through hole is degraded.

Further, in the die molding apparatus of the aforementioned type, the gas charging nozzle is arranged such that the surface at the top end thereof is flush with the inner surface of the cavity and the gas is charged to the inside of the cavity from the gas charging hole provided at the inner end of a tapered recess open to the top end.

However, in the gas charging nozzle of the arrangement described above, the gas tends to leak from the top end of the gas charging nozzle to often result in defective articles. In addition, although a ball member is provided at the gas charging hole for preventing the molten resin from flowing back from the gas charging hole into the gas charging nozzle, the molten resin reaches the gas charging hole along the inner surface of the recess and the ball is caught and fixed by the molten resin to often clog the gas charging hole.

Furthermore, in the existent molding apparatus, a molten resin reaches the gas charging hole along the inner surface of the recess to form a tapered hollow cylindrical portion integrally at one end of the completed molding resin article. Then, the hole or opening at the outer end of the hollow cylinder has to be sealed after the completion of resin molding process (hereinafter, the hollow cylinder portion is referred to as a hole-sealed hollow cylinder). However, since the thickness of the molten resin flowing along the inner surface of the recess is very small, the gas tends to leak through the wall portion of the hole-sealed hollow cylinder. This sometimes results in defective articles. Further, since the hole-sealed hollow cylinder can not always be formed into a definite identical shape, it sometimes makes the sealing treatment for closing the opening at the outer end of the hole-sealed hollow cylinder troublesome.

OBJECT OF THE INVENTION

A first object of the present invention is to overcome such drawbacks and to provide a die molding apparatus for molding a resin article, capable of saving additional subsequent finishing treatment and giving excellent aesthetic appearance for the resin article.

A second object of the present invention is to provide a die molding apparatus for molding a resin article, capable of preventing the leakage of a gas to be charged from a gas charging nozzle into a cavity and also capable of preventing a gas charging hole from being clogged.

A third object of the present invention is to provide a die molding apparatus for molding a resin article, capable of avoiding the leakage of a gas charged from a gas charging nozzle in a cavity and capable of stabilizing the shape of a hole-sealed hollow cylinder, thereby facilitating subsequent sealing treatment.

SUMMARY OF THE INVENTION

In accordance with the first aspect of the present invention, the foregoing first object can be attained by a die molding apparatus for molding resin articles, the apparatus having a plurality of molds for forming a cavity including a main cavity portion extending substantially linearly in a mold closure state one end thereof being in communication with an injection gate, and a gas charging nozzle capable of charging at least the inside of the main cavity portion with a gas from the one end after injection of a predetermined amount of molten resin from the injection gate has been completed, and the apparatus being used to form a resin article including a main portion having to a shape conforming the shape of the main cavity portion and having a hollow inside formed by the charging of the gas to a shape corresponding to the shape of the cavity, wherein an overflow portion for relieving an excess molten resin from the main cavity portion and a film gate for communication between the other end of the main cavity portion and the overflow portion are formed between a pair of molds that define the other end of the main cavity portion, and the gap between the pair of the molds is set to 1.5 mm or less at a part corresponding to the film gate.

According to the constitution described above, since the excess molten resin in the main cavity portion is relieved from the other end of the main cavity portion to the overflow portion, localized increase of the wall thickness at the other end of the main portion of the molded resin article can be prevented thereby enabling to prevent sink marks after the completion of molding, which worsened the commercial worth of the article so far.

Particularly, the other end of the main cavity portion and the overflow portion are connected by way of the film gate, and it has been confirmed experimentally by the present inventors that the gas is not relieved from the film gate to the overflow portion providing that the gap between both of the molds is 1.5 mm or less at a part corresponding to the film gate.

Accordingly, when the end of the film gate on the side of the main cavity portion is cut off from the resin article after the completion of the molding resin article so as to remove the excess portion corresponding to the film gate and the overflow portion, a through hole which was formed undesirably by the gas, is no more present at the other end of the main portion of the article. Thus, a subsequent treatment for closing such through hole is not necessary, to save additional labors and, accordingly, aesthetic appearance after the cutting is not deteriorated.

Further, in a modified embodiment of the first aspect of the present invention described above, the molds are adapted such that the resin article integrally comprises a main portion of article having a decorative surface on one surface and a projection projecting from the other end of the main portion of article on the side opposite to the decorative surface, and the overflow portion and the film gate are formed between a mold fir forming the decorative surface of the main portion of article, and another mold for forming a lightening portion open to the other end of the main portion of article.

In this modified constitution, the gap between the mold for forming the lightening portion and the mold for forming the decorative surface of the main portion of article can be narrowed to restrict the flowing area of the gas at the upstream of the film gate along the flowing direction of the molten resin and the gas at the other end of the main cavity portion, so that the flow of the gas from the film gate to the overflow portion can be shut off more effectively. Furthermore, since a projection projecting on the side opposite to the decorative surface is disposed integrally and in contiguous with the other end of the main portion of article having the decorative surface on one surface, the wall-thickness at the other end of the main portion is not reduced excessively by the formation of the lightening portion.

In accordance with a second aspect of the present invention, the foregoing second object can be attained by a die mold molding apparatus for a resin article, the molding apparatus having has a plurality of molds for defining a cavity in communication with an injection gate in a mold closure state, and a gas charging nozzle capable of charging the inside of the cavity with a gas after injection of a predetermined amount of molten resin from the injection gate has been completed, and the molding apparatus being used to mold a resin article having a hollow inside formed by charging of the gas to a shape conforming the shape of the cavity, wherein the gas charging nozzle is situated in the cavity such that a gas charging hole provided at a top end of the nozzle is arranged at a position corresponding to the hollow inside of the resin article.

According to the constitution described above, since the gas charging nozzle having the gas charging hole at the top end situates in the cavity such that the gas charging hole is arranged at a position corresponding to the hollow inside formed in the resin article, the top end of the gas charging nozzle penetrates the shell wall of the resin article that defines the hollow inside and the wall thickness of the molten resin at the periphery of the top end of the gas charging nozzle is increased to minimize the leakage of the gas and reduce the worry of resulting in defective articles. In addition, since the gas charging hole is exposed to the charging gas, it is also possible to prevent clogging of the gas charging hole.

In accordance with the third aspect of the present invention, the foregoing object can be attained by a die mold molding apparatus for a resin article, the molding apparatus having a plurality of molds for forming a cavity in communication with an injection gate in a mold closure state, and a gas charging nozzle capable of charging the inside of the cavity with a gas after injection of a predetermined amount of molten resin from the injection gate has been completed, and the molding apparatus being used to mold a resin article having a hollow inside formed by charging of the gas to a shape conforming the shape of the cavity, wherein an insertion hole in communication with the inside of the cavity is provided in one of molds that corresponds to one end of the cavity;

the gas charging nozzle to be inserted into the insertion hole has a cylindrical large diameter portion fitted in the insertion hole and a cylindrical small diameter portion coaxially contiguous with the top end of the cylindrical large diameter portion while forming a circular step facing the cavity between the large diameter portion and the small diameter portion, and a hole-sealed hollow cylinder which integrally projects from the resin article and which is to be subjected to a hole sealing treatment after completion of molding of the resin article is formed between one of the molds that corresponds to one end of the cavity and the gas charging nozzle, the hole-sealed hollow cylinder having an inner surface shape defined by the outer surface of the cylindrical small diameter portion and the step portion and an outer surface shape defined by the inner surface of the insertion hole provided in the cavity.

In accordance with the constitution described above, since the hole-sealed hollow cylinder having the inner surface shape defined by the outer surface of the cylindrical small diameter portion and by the step portion and the outer surface shape defined by the inner surface of the insertion hole provided in the cavity is formed being integrally projected from the molding resin article by the charging of the gas after injection of the molten resin, the wall-thickness of the hole-sealed hollow cylinder can be increased to minimize the leakage of the gas thereby enabling to reduce the worry of resulting in defective articles and, further, it is possible to form the hole-sealed hollow cylinder always in an identical definite shape thereby facilitating the subsequent sealing treatment for the opening or hole at the outer end of the hole-sealed hollow cylinder.

DESCRIPTION OF THE ACCOMPANYING DRAWINGS

The present invention is to be described below on the basis of a preferred embodiment shown in the accompanying drawings, wherein .

DESCRIPTION OF PREFERRED EMBODIMENT

Figure 1:
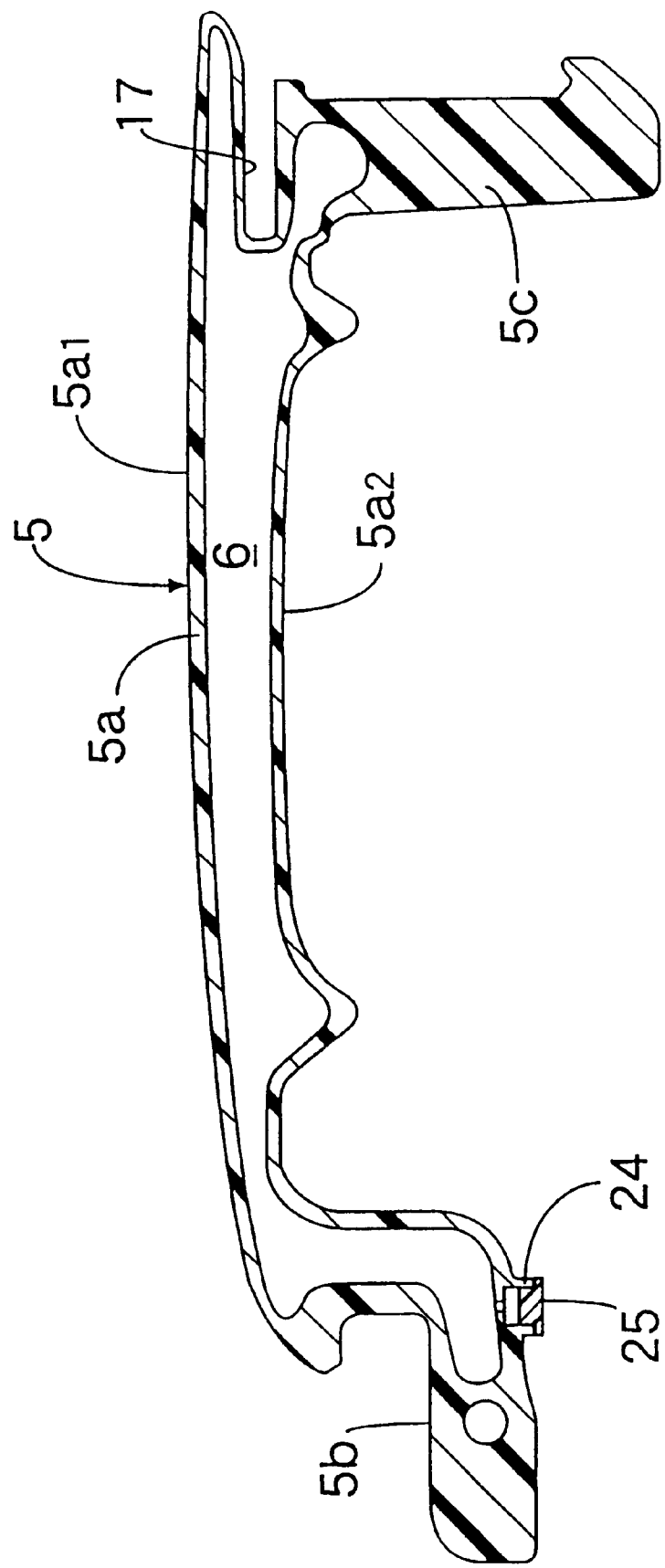
FIG. 1 is a longitudinal cross sectional view of a vehicle outdoor handle.
Figure 2:
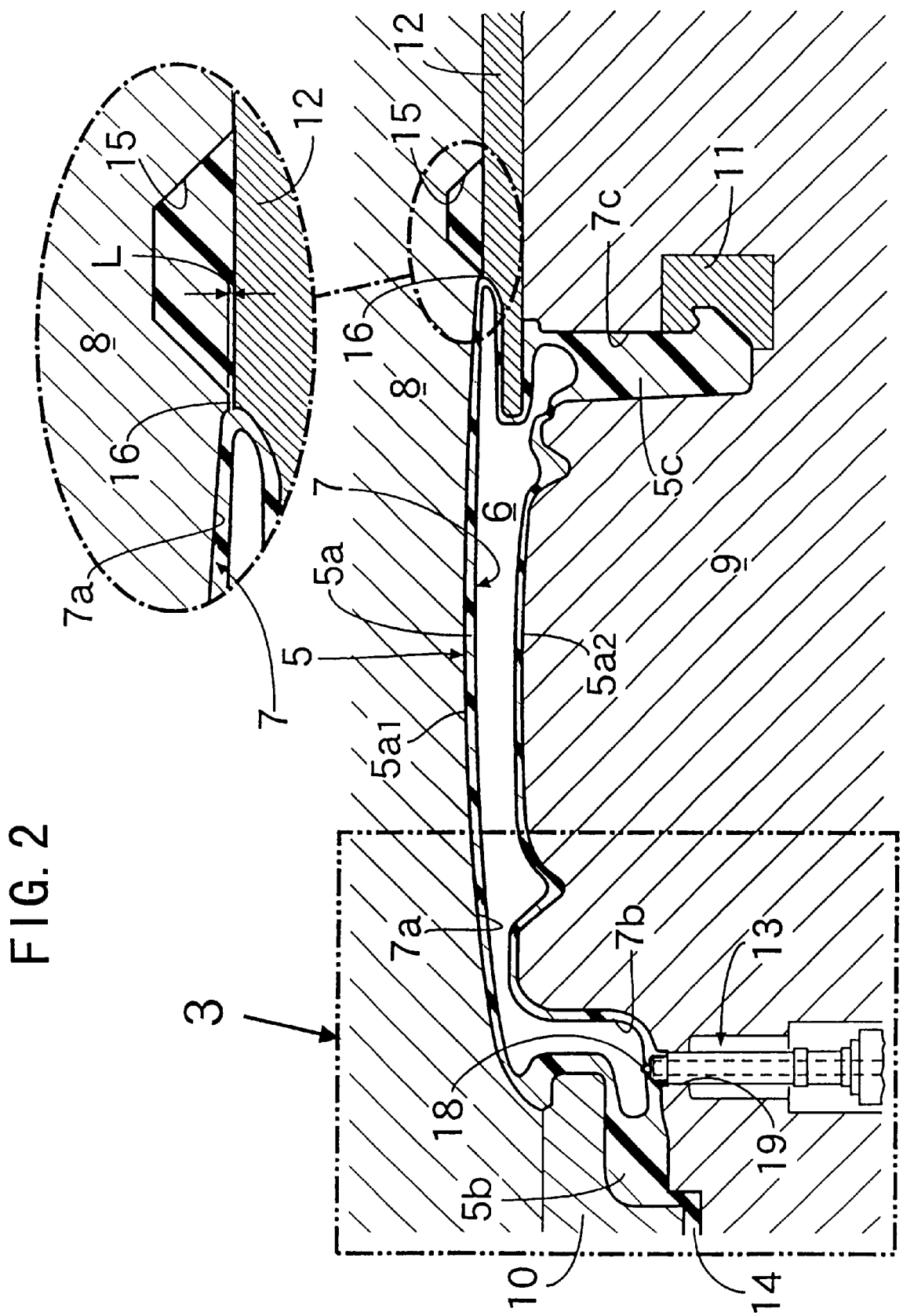
FIG. 2 is a longitudinal cross sectional view of a die molding apparatus in a mold closure state.
Figure 3:
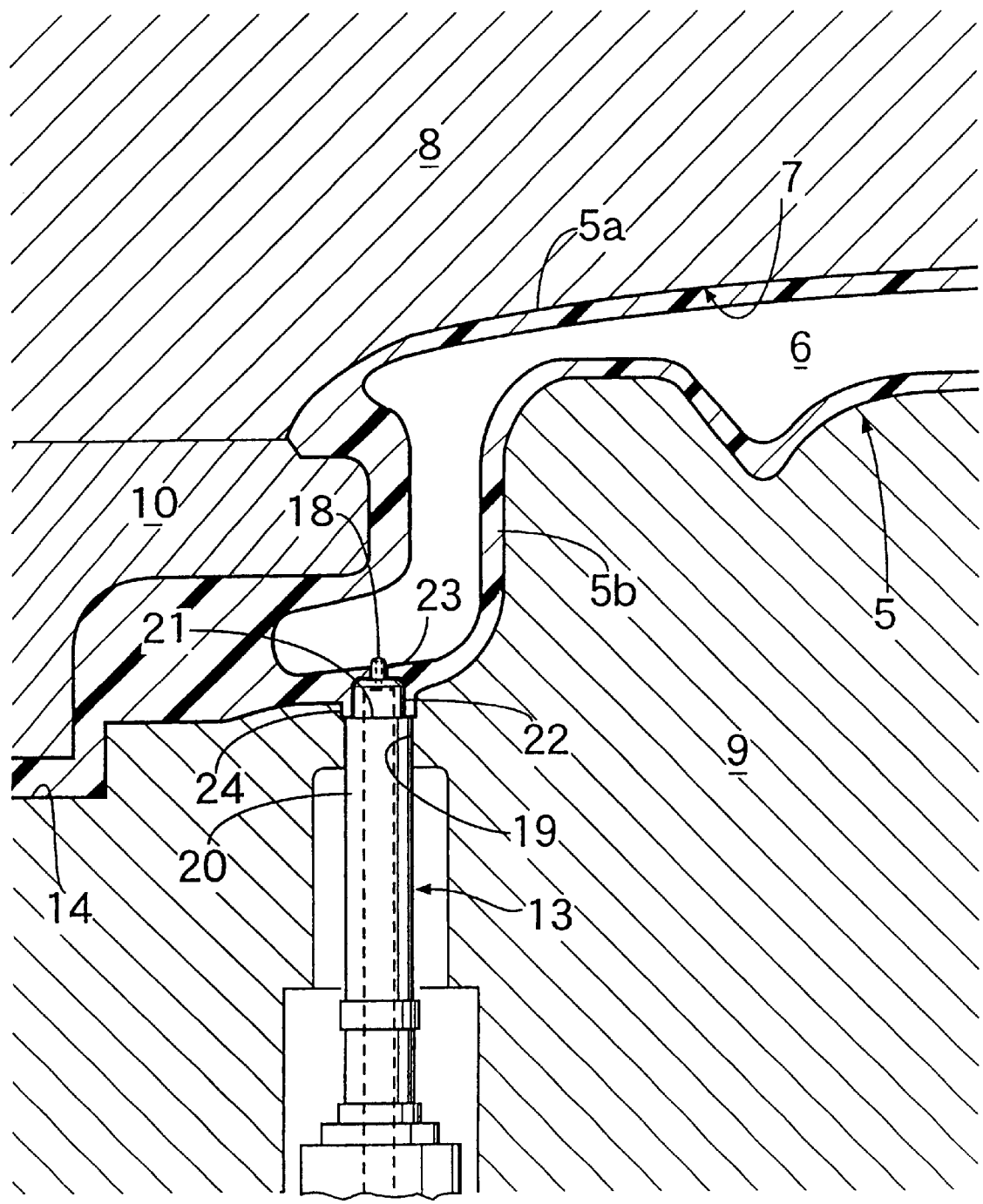
FIG. 3 is an enlarged view for a portion indicated by an arrow 3 shown in FIG. 2.

FIG. 1 to FIG. 3 show a preferred embodiment of the present invention, in which FIG. 1 is a longitudinal cross sectional view of a vehicle outdoor handle, FIG. 2 is a longitudinal cross sectional view of a die molding apparatus in a mold closed state, and FIG. 3 is an enlarged view for a portion of FIG. 2 shown by an arrow 3.

At first, in FIG. 1, an article made of a synthetic resin is an outdoor handle 5 to be provided on the outer surface of a vehicle door, and it comprises respective portions 5a, 5b and 5c integrally. Namely, a main handle portion 5a as a main portion of the article extends substantially linearly with one side surface being as a decorative surface $5a_1$. A generally L-shaped first projection 5b projects from the other side surface $5a_2$ (opposite to the decorative surface $5a_1$) to the side opposite to the decorative surface $5a_1$ at one longitudinal end of the main handle portion 5a. A second projection 5c projects from the other side surface $5a_2$ to the side opposite to the decorative surface $5a_1$ at the other longitudinal end of the main handle portion 5a. A hollow inside portion 6 is formed by the charging of the gas in a portion of the first projection 5b and in the main handle portion 5a.

The first projection 5b is turnably supported on a vehicle door, and the second projection 5c is connected with a lock unit of the vehicle door in use.

The outdoor handle 5 is formed by a die molding apparatus shown in FIG. 2. The die molding apparatus has a plurality of molds, for example, first to fifth molds 8, 9, 10, 11 and 12 which define a cavity 7 conforming the shape of the outdoor handle 5 in a mold closure state, and has a gas charging nozzle 13 for filling the inside of the cavity 7 with a gas for forming the hollow inside portion 6.

The cavity 7 includes a main cavity portion 7a extending substantially linearly corresponding to the main handle portion 5a, a first projection forming portion 7b corresponding to the first projection 5b in communication with one longitudinal end of the main cavity portion 7a and a second projection forming portion 7c corresponding to the second projection 5c in communication with the other longitudinal end of the main cavity portion 7a. An injection gate 14 in communication with the first projection forming portion 7b is formed between the second and third molds 9 and 10. That is, the injection gate 14 is in communication with one longitudinal end of the main cavity portion 7a by way of the first projection forming portion 7b , and a predetermined amount of molten resin is injected from the injection gate 14 to the cavity 7.

An overflow portion 15 for relieving an excess molten resin from the main cavity portion 7a and a film gate 16 for connecting the other end of the main cavity portion 7a with the overflow portion 15 are formed between the first and fifth molds 8 and 12 that define the other end of the main cavity portion 7a. The distance L between the first and fifth molds 8 and 12 is set to 1.5 mm or less at a part corresponding to the film gate 16.

The first mold 8 forms a decorative surface 5a, of the main handle portion 5a, while the fifth mold 12 forms a lightening portion 17 (refer to FIG. 1) which opens in the other end of the main handle portion 5a between the decorative surface 5a and the second projection 5c.

Referring also to FIG. 3, the gas charging nozzle 13 enters the cavity 7 such that a gas charging hole 18 provided at the top end of the nozzle is arranged at a position corresponding to a hollow inside portion 6 in the outdoor handle 5.

An insertion hole 19 in communication with the inside of the cavity 7 is provided in the second mold 9 that corresponds to the other side surface $5a_2$ at one end of the cavity 7, at a position near the injection gate 14. The gas charging nozzle 13 is inserted into the insertion hole 19.

Further, at the top end of the gas charging nozzle 13, are provided a cylindrical large diameter portion 20 which is fitted into the insertion hole 19, a cylindrical small diameter portion 22 which is coaxially in communication with the top end of the cylindrical large diameter portion 20 and which forms a circular step 21 facing the cavity 7 between the cylindrical large diameter portion 20 and the cylindrical nozzle portion 23 which has a diameter smaller than that of the cylindrical small diameter portion 22 and which is coaxially in communication with the top end of the cylindrical small diameter portion 22. A gas charging hole 18 opens in the top end of the nozzle portion 23.

In the gas charging nozzle 13, a flow channel for cooling water (not shown in the drawing) is provided, such that the top end of the gas charging nozzle 13 in contact with the molten resin is not overheated.

According to the die molding apparatus described above, after the molding of the outdoor handle 5, a hole-sealed hollow cylinder 24 is formed in a cylindrical form between the top end of the gas charging nozzle 13 and the second mold 9 integrally projecting from the first projection 5b. That is, the hole-sealed hollow cylinder 24 is formed into a cylindrical shape having an inner surface defined by the outer surface of the cylindrical small diameter portion 22 and the step 21, and an outer surface defined by the inner surface of the insertion hole 19 provided in the cavity 7. After the completion of molding for the outdoor handle 5, opening at the outer end of the hole-sealed hollow cylinder 24 is sealed by a hole sealing treatment such as by welding of a synthetic resin lid member 25 fitted in the hole-sealed hollow cylinder 24 to the outer end surface of the hole-sealed hollow cylinder 24.

Next, the operation of the molding apparatus of this embodiment will be described.

Among the first to fifth molds 8 to 12 for forming the outdoor handle 5, the first and fifth molds 8 and 12 are used for forming the other end of the main cavity portion 7a. Since the overflow portion 15 for relieving the excess molten resin from the main cavity portion 7a and the film gate for connecting the other end of the main cavity portion 7a and the overflow portion 15 are formed between the molds 8 and 12, the excess molten resin from the main cavity portion 7a is relieved from the other end of the main cavity portion 7a to the overflow portion 15. This can avoid localized increase in the wall thickness and thus undesirable mold sink marks at the other end of the main handle portion 5a in the outdoor handle 5 after the completion of molding thereby preventing degradation for the commercial worth of the article.

Further, a gap L between the first and fifth molds 8 and 12 is set to 1.5 mm or less at a part corresponding to the film gate 16. The present inventor has confirmed experimentally that the gas is not relieved from the film gate 16 to the overflow portion 15 if the gap L is 1.5 mm or less. Accordingly, no through hole is formed by the gas flow at the other end of the main handle portion 5a. After the completion of molding for the outdoor handle 5, when the end portion of the film gate 16 on the side of the main cavity portion 7a is cut off to remove the excess portion corresponding to the film gate 16 and the overflow portion 15 from the outdoor handle 5, no additional treatment is necessary for closing such through hole formed in the existent molding apparatus. Further, the aesthetic appearance of the article after the cutting is not degraded.

Further, a second projection 5c projecting on the side opposite to the decorative surface $5a_1$ of the main handle portion 5a is disposed integrally at the other end of the main handle portion 5a in the outdoor handle 5. The overflow portion 15 and the film gate 16 are formed as described above between the first mold 8 for forming the decorative surface $5a_1$ of the main handle portion 5a and the fifth mold 12 for forming the lightening portion 17 that opens in the other end of the main handle portion 5a between the decorative surface $5a_1$ and the second projection 5c.

According to the mold structure, it is possible to narrow a gap between the first and fifth molds 8 and 12, and restrict a flowing area of the gas at the upstream of the film gate 16 along the flowing direction of the molten resin and the gas in the other end of the main cavity portion 7a. Therefore, the gas flow from the film gate 16 to the overflow portion 15 can be shut off more effectively. Further, since the second projection 5c is formed integrally with the other surface $5a_2$ at the other end of the main handle portion 5a, the wall-thickness at the other end of the main handle portion 5a is not reduced excessively by the formation of the lightening portion 17.

Further, gas charging nozzle 13 is situated in the cavity 7 such that the gas charging hole 18 provided at the top end of the nozzle is arranged to a position corresponding to the hollow inside portion 6. Therefore, the top end of the gas charging nozzle 13 penetrates the shell wall of the outdoor handle 5 that forms the hollow portion 6, so that it is possible to increase the thickness of the molten resin at the periphery of the top end of the gas charging nozzle 13 and minimize the leakage of the gas thereby reducing the worry of resulting in defective articles. Since the gas charging hole 18 is exposed to the charging gas, it is also possible to prevent the gas charging hole 18 from being clogged.

Further, the insertion hole 19 in communication with the inside of the cavity 7 is provided in the second mold 9 and the gas charging nozzle 13 is inserted in the insertion hole 19.

At the top end of the nozzle 13, are provided a cylindrical large diameter portion 20 which is to be fitted into the insertion hole 19 and a cylindrical small diameter portion 22 which is coaxially in communication with the top end of the cylindrical large diameter portion and which forms a circular step 21 facing the cavity 7 between the large diameter portion 20 and the small diameter portion 22.

Then, when the gas is charged after the injection of the molten resin, the cylindrical hole-sealed hollow cylinder 24 is formed between the second mold 9 and the gas charging nozzle 13 while being integrally projected from the first projection 5b of the outdoor handle 5.

The hollow cylinder 24 has the inner surface defined by the outer surface of the cylindrical small diameter portion 22 and the step 21 and the outer surface defined by the inner surface of the insertion hole 19 provided in the cavity 7. Accordingly, it is possible to increase the wall-thickness of the hole-sealed hollow cylinder 24 to minimize the leakage of the gas and reduce the worry of resulting in defective articles.

Further, the hole-sealed hollow cylinder 24 can always be formed into an identical definite shape and the opening at the outer end of the hole-sealed hollow cylinder 24 can easily be closed, for example, by the welding of the lid member 25.

As described above, according to the present invention, localized increase of the wall thickness at the other end of the main portion of the resin article can be prevented thereby enabling to prevent occurrence of undesired sink marks after the completion of molding, and prevent degradation of the commercial worth of the article. In addition, subsequent treatment is no more necessary to save additional labors, and excellent aesthetic appearance can also be provided.

Further, according to the present invention, it is possible to shut off the flow of the gas from the film gate to the overflow portion more effectively, while keeping the wall-thickness in the other end of the part main portion from being reduced excessively.

Further, it is also possible to minimize the gas leakage to thereby reduce the worry of resulting in defective articles and, in addition, minimize clogging of the gas charging hole.

Further, according to the present invention, the wall-thickness of the hole-sealed hollow cylinder can be increased to minimize the leakage of the gas thereby enabling to reduce the worry of resulting in defective articles and, further, it is possible to make the shape of the hole-sealed hollow cylinder stable to facilitate the sealing treatment for the opening at the outer end of the hole-sealed hollow cylinder.

The preferred embodiment of the present invention has thus been described in details, but the present invention is not limited only to the embodiment described above, and various modifications are possible without depart the scope of the present invention.

For example, the present invention is not restricted only to the vehicle outdoor handle, but it is applicable generally as a die molding apparatus for forming resin articles having a hollow portion formed by the gas charging.

What is claimed is:

1. A die molding apparatus for molding resin articles,
the apparatus having a plurality of molds for forming a cavity including a main cavity portion extending substantially linearly in a mold closure state one end thereof being in communication with an injection gate, and a gas charging nozzle capable of charging at least the inside of the main cavity portion with a gas from the one end after injection of a predetermined amount of molten resin from the injection gate has been completed, and
the apparatus being used to form a resin article including a main portion having a shape conforming to the shape of the main cavity portion and having a hollow inside formed by the charging of the gas to a shape corresponding to the shape of the cavity, wherein
an overflow portion for relieving an excess molten resin from the main cavity portion and a film gate having a flat film shaped passage for communication between an end of the main cavity portion and the overflow portion,
the gate is present between the pair of molds with the planes of the passage extending along the mating faces of the molds, and
the gap between the pair of the molds is set to 1.5 mm or less and more than 0 mm at a part corresponding to the film gate.

2. A die molding apparatus for a resin article as defined in claim 1, wherein the molds are adapted such that the resin article integrally comprises a main portion of article having a decorative surface on one surface and a projection projecting from the other end of the main portion of article on the side opposite to the decorative surface, and the overflow portion and the film gate are formed between a mold fir forming the decorative surface of the main portion of article, and another mold for forming a lightening portion open to the other end of the main portion of article.

3. A mold molding apparatus of a resin article
the molding apparatus having a plurality of molds for forming a cavity in communication with an injection gate in a mold closure state, and a gas charging nozzle capable of charging the inside of the cavity with a gas after injection of a predetermined amount of molten resin from the injection gate has been completed, and the molding apparatus being used to mold a resin article having a hollow inside formed by charging of the gas to a shape conforming the shape of the cavity, wherein an insertion hole in communication with the inside of the cavity is provided in one of molds that corresponds to one end of the cavity;

the gas charging nozzle to be inserted into the insertion hole has a cylindrical large diameter portion fitted in the insertion hole and a cylindrical small diameter portion coaxially contiguous with the top end of the cylindrical large diameter portion while forming a circular step facing the cavity between the large diameter portion and the small diameter portion, and a hole-sealed hollow cylinder which integrally projects from the resin article and which is to be subjected to a hole sealing treatment after completion of molding of the resin article is formed between one of the molds that corresponds to one end of the cavity and the gas charging nozzle, the hole-sealed hollow cylinder having an inner surface shape defined by the outer surface of the cylindrical small diameter portion and the step portion and an outer surface shape defined by the inner surface of the insertion hole provided in the cavity.

* * * * *